United States Patent [19]
Kawahata

[11] Patent Number: 5,711,584
[45] Date of Patent: Jan. 27, 1998

[54] HYDRAULIC BRAKE APPARATUS FOR PREVENTING SHORTAGE OF BRAKE FLUID IN A MASTER CYLINDER DUE TO FAILURE OF A HIGH PRESSURE SOURCE

[75] Inventor: Fumiaki Kawahata, Toyota, Japan

[73] Assignee: Toyota Jidosha Kabushiki Kaisha, Aichi-Ken, Japan

[21] Appl. No.: 721,155

[22] Filed: Sep. 26, 1996

[30] Foreign Application Priority Data

Oct. 9, 1995 [JP] Japan ................................ 7-261810

[51] Int. Cl.$^6$ ............................ B60T 13/12; B60T 13/68
[52] U.S. Cl. ................................ 303/122.12; 303/117.1
[58] Field of Search .......................... 303/171.1, 113.1, 303/116.1, 116.2, 119.1, 119.2, 122.09, 122.12, DIG. 1–4, 122, 122.13, 115.4, 901, 84.1, 84.2, 122.14, 10, 11

[56] References Cited

U.S. PATENT DOCUMENTS 5,330,258  7/1994  Hoshoya et al. .............. 303/117.1 X
5,486,040  1/1996  Beck et al. ..................... 303/901 X

FOREIGN PATENT DOCUMENTS 6-312658  11/1994  Japan .

Primary Examiner—Josie Ballato
Attorney, Agent, or Firm—Kenyon & Kenyon

[57] ABSTRACT

A hydraulic brake apparatus maintains a sufficient amount of brake fluid in a master cylinder when a failure occurs in a high pressure brake fluid source which provides a high pressure brake fluid to a wheel cylinder. The hydraulic brake apparatus generates a wheel cylinder pressure provided to the wheel cylinder by using a high pressure brake fluid provided by the high pressure brake fluid source. The wheel cylinder pressure is controlled in response to a master cylinder pressure generated by a master cylinder. A fluid pressure control valve, having a spool movable in response to the master cylinder pressure, connects one of the high pressure brake fluid source and a low pressure brake fluid source to the wheel cylinder so that the wheel cylinder pressure is controlled in response to the master cylinder pressure. A low pressure source passage connects the low pressure brake fluid source to the fluid pressure control valve so as to supply a low pressure brake fluid to the fluid pressure control valve. A low pressure source passage control valve closes the low pressure source passage when the high pressure brake fluid is not provided to the fluid pressure control valve.

10 Claims, 4 Drawing Sheets

HYDRAULIC BRAKE APPARATUS FOR PREVENTING SHORTAGE OF BRAKE FLUID IN A MASTER CYLINDER DUE TO FAILURE OF A HIGH PRESSURE SOURCE

BACKGROUND OF THE INVENTION

1. Field of the Invention

The present invention relates to a hydraulic brake apparatus and, more particularly, to a hydraulic brake apparatus which has a spool valve for controlling wheel cylinder pressure in response to master cylinder pressure by connecting one of a high pressure source and a low pressure source to a wheel cylinder.

2. Description of the Related Art

A hydraulic brake apparatus is disclosed in Japanese Laid-Open Patent Application No.6-312658. This hydraulic brake apparatus comprises a spool valve having a spool which moves in response to a master cylinder pressure so that one of a high pressure source and a low pressure source is connected to a wheel cylinder so as to control wheel cylinder pressure in response to master cylinder pressure. In this hydraulic brake apparatus, the spool is maintained at a position where the low pressure source is connected to a controlled pressure port of the spool valve. The spool is moved toward a position where the high pressure source is connected to the controlled pressure port as the master cylinder pressure is increased in response to a braking operation.

The controlled pressure port is connected to a wheel cylinder which generates a brake force provided to a wheel of a vehicle. Thus, the wheel cylinder is connected to the low pressure source when the master cylinder pressure is low, and the wheel cylinder is connected to the high pressure source when the master cylinder pressure is high. According to this construction, a wheel cylinder pressure corresponding to the master cylinder pressure can be obtained.

In the above-mentioned hydraulic brake apparatus, a wheel cylinder pressure higher than the master cylinder pressure is obtained by introducing a high hydraulic pressure generated by a high pressure source into the wheel cylinder. Accordingly, when the high pressure source functions normally, a sufficiently high brake force can be generated by a relatively low master cylinder pressure. However, in the case of failure of the high pressure source, the master cylinder pressure must be directly supplied to the wheel cylinder to generate a desired brake force. In this case, in order to generate a sufficiently large brake force, the master cylinder pressure must be increased at a much higher level than that needed when the high pressure source functions in a normal condition.

In the above-mentioned spool valve, a small clearance is provided between the spool and a spool cylinder accommodating the spool so as to maintain smooth movement of the spool. In this structure, when a pressurized brake fluid is supplied from the master cylinder to a chamber connecting to an end surface of the spool, a part of the brake fluid flows to a low pressure source through the clearance formed around the spool. The amount of brake fluid passing through the clearance to the low pressure source side is considerably large when a failure occurs in the high pressure source because a high master cylinder pressure is generated and supplied to the chamber connecting to the end of the spool. In this case, there is a problem in that the brake fluid in the master cylinder is rapidly reduced, and thus a piston pressurizing the brake fluid in the master cylinder may move to the end of its stroke in a short time. When the piston in the master cylinder reaches the end of its stroke, the master cylinder pressure cannot be generated.

SUMMARY OF THE INVENTION

It is a general object of the present invention to provide an improved and useful hydraulic brake apparatus in which the above-mentioned problem is eliminated.

A more specific object of the present invention is to provide a hydraulic brake apparatus in which a sufficient amount of brake fluid is maintained in a master cylinder when a failure occurs in a high pressure source which provides a high pressure brake fluid to a wheel cylinder.

In order to achieve the above-mentioned objects, there is provided according to the present invention a hydraulic brake apparatus which generates a wheel cylinder pressure provided to a wheel cylinder by using a high pressure brake fluid provided by a high pressure brake fluid source, the wheel cylinder pressure being controlled in response to a master cylinder pressure generated by a master cylinder, the hydraulic brake apparatus comprising:

a fluid pressure control valve having a spool movable in response to the master cylinder pressure put on one side thereof so as to connect one of the high pressure brake fluid source and a low pressure brake fluid source to the wheel cylinder so that the wheel cylinder pressure is controlled in response to the master cylinder pressure;

a low pressure source passage connecting the low pressure brake fluid source to the fluid pressure control valve so as to supply a low pressure brake fluid to the fluid pressure control valve; and a low pressure source passage control valve for closing the low pressure source passage when the high pressure brake fluid is not provided to the fluid pressure control valve.

The hydraulic brake apparatus according to the above-mentioned invention provides the wheel cylinder pressure in response to the master cylinder pressure when the high pressure brake fluid source is operated normally. In this case, the wheel cylinder pressure is controlled by selectively connecting the wheel cylinder to one of the high pressure brake fluid source and the low pressure brake fluid source. Thus, the master cylinder pressure provided to the fluid pressure control valve does not continue to be a high pressure. However, if a failure occurs in the high pressure brake fluid source, the high pressure brake fluid source cannot be provided to the fluid pressure control valve. If such a condition happens, according to the present invention, the master cylinder pressure is directly provided to the wheel cylinder via the fluid pressure control valve so as to obtain a sufficient brake force. However, in this case, it is possible that the master cylinder pressure should be maintained at a high pressure for a long period of time when a large brake force should be generated for a long period of time. If such a condition happens, the low pressure source passage is closed by the low power source passage control valve. The low pressure source passage is closed to prevent the brake fluid in the master cylinder from flowing out to the low pressure brake fluid source via the fluid pressure control valve. Thus, a bottoming of the master cylinder due to shortage of brake fluid in the master cylinder can be prevented when a failure occurs in the high pressure brake fluid source.

The above-mentioned hydraulic brake apparatus according to the present invention may further comprise a control valve for connecting the master cylinder passage and a portion of the low pressure source between the low pressure source passage control valve and the fluid pressure control valve, the control valve being opened when the high pressure brake fluid is not provided to the fluid pressure control valve.

Additionally, the above-mentioned hydraulic brake apparatus according to the present invention may further comprise a first check valve for allowing a brake fluid flow in a direction from the master cylinder to the wheel cylinder.

Further, the above-mentioned hydraulic brake apparatus according to the present invention may further comprise a second check valve for allowing brake fluid flow in a direction from a portion of the low pressure source passage between the low pressure source passage control valve and the fluid pressure control valve to the master cylinder.

Additionally, the hydraulic brake apparatus according to the present invention may further comprise:

a first check valve for allowing a brake fluid flow in a direction from the master cylinder to the wheel cylinder; and a second check valve for allowing a brake fluid flow in a direction from a portion of the low pressure source passage between the low pressure source passage control valve and the fluid pressure control valve to the master cylinder.

In this invention, brake fluid can flow in the direction from the master cylinder to the wheel cylinder via the first check valve without a reverse flow when the high pressure brake fluid source fails to provide the high pressure brake fluid to the fluid pressure control valve. Thus, the master cylinder pressure can be provided to the wheel cylinder when a failure occurs in the high pressure brake fluid source. Additionally, the second check valve allows the brake fluid in the wheel cylinder to flow back to the master cylinder when the master cylinder pressure is decreased. Thus, the wheel cylinder pressure can be rapidly decreased when the master cylinder pressure is released.

The low pressure source passage control valve may comprise a mechanically operated valve. Additionally, the mechanically operated valve is connected to the high pressure brake fluid source so as to receive the high pressure generated in the high pressure brake fluid source as a pilot pressure to control a closing operation of the mechanically operated valve. Additionally, the mechanically operated valve may close when the pilot pressure is lower than a predetermined pressure. The mechanically operated valve can be of a simple construction and, thus, it reduces manufacturing cost.

Alternately, the low pressure brake fluid source may comprise an electrically operated valve. If the electrically operated valve is provided, the hydraulic brake apparatus according to the present invention may further comprise a pressure sensor for sensing a pressure in the high pressure brake fluid source and a control unit for sending a drive signal to the electrically operated valve when the pressure sensed by the pressure sensor is lower than a predetermined pressure, the electrically operated valve being closed when the drive signal is supplied thereto.

Other objects, features and advantages of the present invention will become more apparent from the following detailed description when read in conjunction with the accompanying drawings.

DETAILED DESCRIPTION OF THE PREFERRED EMBODIMENTS

Figure 1:
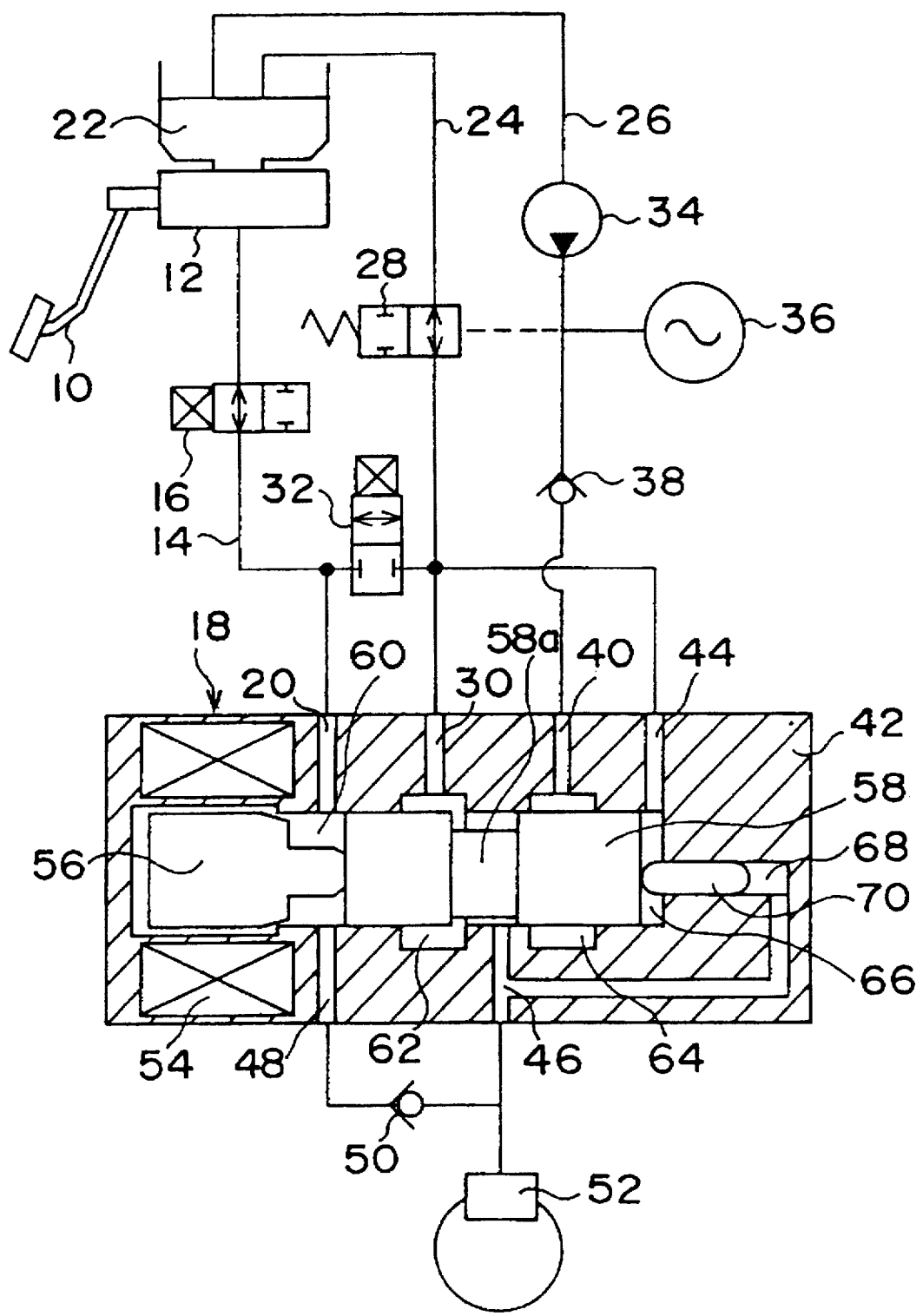
FIG. 1 is a system diagram of a hydraulic brake apparatus according to a first embodiment of the present invention.

A description will now be given of a first embodiment of the present invention. FIG. 1 is a system diagram of a hydraulic brake apparatus according to the first embodiment of the present invention. In FIG. 1, only one wheel of a vehicle and brake fluid line corresponding to the shown wheel are indicated for the sake of convenience.

In FIG. 1, a brake pedal 10 is provided in a foot space of a driver's position of the vehicle. The brake pedal 10 is connected to a master cylinder 12. The master cylinder 12 is of a tandem type which comprises two hydraulic chambers therein. Each of the hydraulic chambers is connected to a separate hydraulic circuit. Each hydraulic circuit is provided for controlling a brake fluid pressure in wheel cylinders of two wheels. Since each hydraulic circuit has the same construction, only one hydraulic circuit is shown in FIG. 1.

The hydraulic chamber of the master cylinder 12 is connected to a master cylinder passage 14. A first control valve 16 is provided in the middle of the master cylinder passage 14. The first control valve 16 is a normally open solenoid valve which closes when a drive signal is supplied thereto. The master cylinder passage 14 is connected to a master cylinder pressure port 20 of a fluid pressure control valve 18 (will be described later), at a position on the downstream side of the first control valve 16.

A reservoir tank 22, which stores the brake fluid under atmospheric pressure, is provided above the master cylinder 12. The brake fluid is supplied from the reservoir tank 22 to the master cylinder 12 when the brake fluid filled in the hydraulic chamber of the master cylinder 12 flows out, that is, the brake fluid in the master cylinder 12 runs short.

The reservoir tank 22 is connected to a low pressure source passage 24 and a high pressure source passage 26. The low pressure source passage 24 is connected to a low pressure source port 30 of the fluid pressure control valve 18 via a low pressure source passage control valve 28. The low pressure source passage 24 is also connected to the master cylinder passage 14 via a second control valve 32 at a position on the downstream side of the low pressure source passage control valve 28, that is, a position between the low pressure source passage control valve 28 and the low pressure source port 30. The second control valve 32 is a normally closed solenoid valve which opens when a drive signal is supplied thereto.

The high pressure source passage 26 is provided with a pump 34, an accumulator 36 and a check valve 38 in that order from the reservoir tank 22. An end of the high pressure source passage 26 opposite to the reservoir tank 22 is connected to a high pressure source port 40 of the fluid pressure control valve 18. The pump 34 pumps up the brake fluid stored in the reservoir tank 22, and delivers the brake fluid to the fluid pressure control valve 18 under a high pressure. The accumulator 36 stores the brake fluid discharged from the pump 34 so as to reduce pulsation of the discharge pressure. The check valve 38 is a one-way valve which allows a flow only in a direction from the pump 34 to the high pressure source port 40. Thus, when operation of the pump 34 is started, a high pressure brake fluid is supplied to the high pressure source port 40 of the fluid pressure control valve 18.

Figure 2:
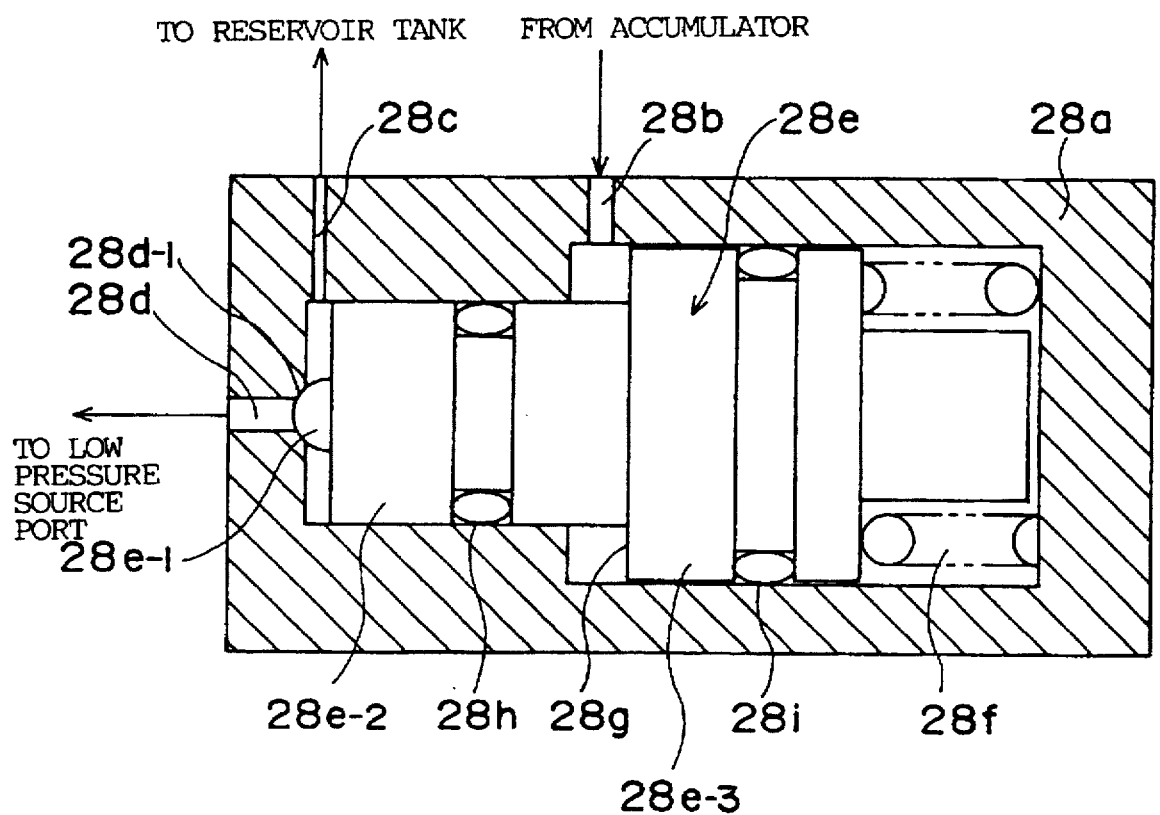
FIG. 2 is a cross sectional view of a low pressure source passage control valve shown in FIG. 1.

The above-mentioned low pressure source passage control valve 28 is a open/close valve which is controlled by a pressure in the accumulator 36 as a pilot pressure. FIG. 2 is a cross sectional view of the low pressure source passage control valve 28. As shown in FIG. 2, the low pressure source passage control valve 28 comprises a housing 28a and a spool 28e movable in the housing 28a. The housing 28a has a pilot port 28b connected to the accumulator 36, a fluid port 28c connected to the reservoir tank 22 and a fluid port connected to the low pressure source port of the fluid pressure control valve 18.

The fluid port 28d is formed in the housing 28a along a center axis of the spool 28e. An end of the spool 28e facing the fluid port 28d has a semispherical valve member 28e-1. The end of the fluid port 28d facing the spool valve 28e has a valve seat 28d-1 so that the valve member 28e-1 seats on the valve seat 28d-1. The spool 28e is urged by a spring 28f toward fluid port 28d. The spool 28e comprises a small diameter portion 28e-2 and a large diameter portion 28e-3 so that a shoulder portion 28g is formed on a side of the large diameter portion 28e-3 between the small diameter portion 28e-2 and the large diameter portion 28e-3. The shoulder portion 28g receives a pressure introduced from the accumulator 36 via the pilot port 28b. O-rings 28h and 28i are provided around the small diameter portion 28e-2 and the large diameter portion 28e-3, respectively.

When the pump 34 is operated normally, brake fluid at a high pressure is provided to the pilot port 28b of the low pressure source passage control valve 28. In this condition, the spool 28e moves leftwardly in FIG. 2 against the pressing force of the spring 28f. Thus, the valve member 28e-1 is separated from the valve seat 28d-1, and the fluid port 28c connects to the fluid port 28d. This state is an open state of the low pressure source passage control valve 28. On the other hand, if a failure occurs in the pump 34 and the pressure in the accumulator is decreased, the spool 28e is moved rightwardly in FIG. 2 by the pressing force of the spring 28f. Thus, the valve member 28e-1 seats on the valve seat 28d-1, and the fluid port 28c is disconnected from the fluid port 28d. This state is a closed state of the low pressure source passage control valve 28.

As discussed above, the low pressure source passage control valve 28 is open when an appropriate high fluid pressure is provided in the accumulator 36, and is closed when the appropriate high fluid pressure is not provided in the accumulator 36. Accordingly, the low pressure source passage 24 shown in FIG. 1 is open when the pump 34 functions normally, and is closed when a failure occurs in the pump 34.

The fluid pressure control valve 18 shown in FIG. 1 comprises a housing 42 having the master cylinder pressure port 20, the low pressure source port 30 and the high pressure source port 40. The housing 42 also has a leakage port 44, a controlled fluid pressure output port 46 and a master cylinder pressure output port 48. The leakage port 44 is connected to the low pressure source passage 24 at a position on the downstream side of the low pressure source control valve 28. The controlled fluid pressure output port 46 is connected to a wheel cylinder 52. The master cylinder pressure output port 48 is also connected to the wheel cylinder 52 via a first check valve 50.

The first check valve is a one-way valve which allows a brake fluid flow only in a direction from the master cylinder pressure output port 48 to the wheel cylinder 52. Accordingly, when a fluid pressure exceeding the wheel cylinder pressure if provided to the master cylinder pressure output port 48, the wheel cylinder pressure is increased to be equal to the pressure provided to the master cylinder pressure output port 48. Actually, the controlled fluid pressure output port 46 and the master cylinder pressure output port 48 are connected to two master cylinders, however, only one wheel cylinder 52 is indicated in FIG. 1 for the sake of convenience.

The housing 42 of the fluid pressure control valve 18 accommodates an electromagnetic coil 54 and a plunger 56. The plunger 56 is formed of a magnetic material, and moves in the fluid pressure control valve 18 in the axial direction. That is, the plunger 56 is movable from left to right or right to left in FIG. 1. The electromagnetic coil 54 and the plunger 56 form a solenoid. That is, when a current flows in the electromagnetic coil 54, an electromagnetic force corresponding to the current is exerted on the plunger 56. In the fluid pressure control valve 18, the electromagnetic force is generated so as to move the plunger rightwardly in FIG. 1.

A spool 58 is accommodated in the housing 42 of the fluid pressure control valve 18. The spool 58 contacts an end of the plunger, and is movable in the housing 42 together with the plunger 56 in the axial direction. The spool 58 has a generally cylindrical shape with an annular groove 58a in the middle.

A master cylinder pressure chamber 60 is formed between the opposite surfaces of the plunger 56 and the spool 58. The master cylinder pressure port 20 and the master cylinder pressure output port 48 are connected to the master cylinder pressure chamber 60. Accordingly, the master cylinder pressure output port 48 is always maintained to be connected to the master cylinder pressure port 20 irrespective of the position of the spool 58.

The low pressure source port 30 and the high pressure source port 40 are connected to a low pressure chamber 62 and a high pressure chamber 64, respectively. The low pressure chamber 62 and the high pressure chamber 64 are formed around the spool 58. The low pressure chamber 62 is connected to the annular groove 58a of the spool 58 when the spool 58 is positioned between the end of its stroke (hereinafter referred to as 0-position) on the plunger 56 side and a first position where the spool 58 is displaced at a first predetermined distance from the 0-position. In this state, the controlled fluid pressure output port 46 is connected to the low pressure source port 30. The high pressure chamber 64 is connected to the annular groove 58a of the spool 58 when the spool 58 is displaced at a second position beyond a second predetermined distance from the 0-position. In this state, the controlled fluid pressure output port 46 is connected to the high pressure source port 40. The second predetermined distance is greater than the first predetermined distance. When the spool is positioned between the first predetermined distance and the second predetermined distance, neither the low pressure chamber 62 nor the high pressure chamber 64 is connected to the annular groove 58a of the spool 58. In this state, the controlled fluid pressure output port 46 is disconnected from both the low pressure source port 30 and the high pressure source port 40.

A leakage chamber 66 is formed on an end of the spool 58 opposite to the plunger 56. The leakage port 44 is connected to the leakage chamber 66. A reaction force chamber 68 extends from the leakage chamber 66 so that one end of the reaction force chamber 68 opens to the leakage chamber 66 and opposite end is connected to the controlled fluid pressure output port 46. A reaction force pin 70 is slidably provided in the reaction force chamber 68. When a fluid pressure is introduced into the reaction force chamber 68 from the controlled fluid pressure output port 46, the reaction force pin 70 exerts a pressing force on the spool 58. Hereinafter, this pressing force is referred to as a hydraulic reaction force.

The hydraulic brake apparatus according to the present embodiment can be operate in the following three modes:

1) a regular mode in which a wheel cylinder pressure corresponding to the master cylinder pressure is generated when the brake pedal 10 is depressed;

2) a pressure decreasing control mode in which a wheel cylinder pressure is decreased to a level lower than the master cylinder pressure when the brake pedal 10 is depressed; and 3) an automatic pressure increasing mode in which a desired wheel cylinder pressure is generated when the brake pedal 10 is not depressed.

The regular mode is achieved by opening the first control valve 16 and closing the second control valve 32. In the regular mode, when the brake pedal 10 is depressed, the brake fluid flowing out from the master cylinder 12 enters the master cylinder pressure chamber of the fluid pressure control valve 18 via the first control valve 16 and the master cylinder pressure port 20.

When the brake fluid enters the master cylinder pressure chamber 60, the spool 58 is moved. When the displacement of the spool 58 exceeds the second predetermined distance, the controlled fluid pressure output port 46 is connected to the high pressure source port 40. Thus, the discharge pressure of the pump 34 is directed to the wheel cylinder 52. As a result, the wheel cylinder pressure is increased. The increase in the wheel cylinder pressure results in an increase in a pressure in the reaction force chamber 68 of the fluid pressure control valve 18. Thus, the hydraulic reaction force is increased, and the spool 58 is moved in a direction to decrease the displacement of the spool 58. The above-mentioned operation is repeatedly performed, resulting in a control of the wheel cylinder pressure at a high pressure in response to the master cylinder pressure. This operation corresponds to the regular mode.

The pressure decreasing control mode is achieved by supplying the drive signals to each of the first control valve 16 and the second control valve 32, that is, by closing the first control valve 16 and opening the second control valve 32. In the pressure decreasing control mode, the master cylinder pressure port 20 is disconnected from the master cylinder 12. Thus, the master cylinder pressure corresponding to the depressing force to the brake pedal 10 is not introduced into the master cylinder pressure chamber 60. Additionally, since the master cylinder pressure port 20 is connected to the low pressure source passage 24, the fluid pressure in the master cylinder pressure chamber 60 is released to atmospheric pressure.

When the pressure in the master cylinder pressure chamber 60 is decreased as discussed above, the spool 58 moves in a direction to decrease the displacement of the spool 58, and finally the spool 58 reaches a position where the controlled fluid pressure output port 46 is connected to the low pressure source port 30. In this state, the pressure in the wheel cylinder 52 is released to the low pressure source passage 24, resulting in the wheel cylinder pressure being less than the master cylinder pressure. Additionally, when an appropriate current is provided to the electromagnetic coil 54 in a state where pressure in the master cylinder pressure chamber is released to the atmosphere, the electromagnetic force exerted on the plunger 56 is provided to the spool 58. This enables control of the wheel cylinder pressure at a desired level.

The above-mentioned automatic pressure increasing mode can be achieved by supplying an appropriate current to the electromagnetic coil 54 in a state where the brake pedal 10 is not depressed. When the brake pedal 10 is not depressed, the pressure in the master cylinder pressure chamber 60 is almost equal to the atmospheric pressure without supplying the drive signals to the first control valve 16 and the second control valve 32. Accordingly, in this state, when an appropriate current is provided to the electromagnetic coil 54, the electromagnetic force exerted on the plunger 56 is provided to the spool 58. Thus, the spool 58 can be moved to a desired position when an appropriate current is supplied to the electromagnetic coil 54. This provides an appropriate wheel cylinder pressure to be generated in response to the electromagnetic force generated by the electromagnetic coil 54. This enables an accurate control of the wheel cylinder pressure at a desired level.

In the hydraulic brake apparatus according to the present embodiment, when the pump 34 functions normally, the discharge pressure of the pump 34 is directed to the wheel cylinder 52 so as to increase the wheel cylinder pressure. The cross-sectional areas of the spool 58 and the reaction force pin 70 are determined so that the fluid pressure control valve 18 functions as a pressure booster. That is, a sufficiently high wheel cylinder pressure can be obtained by a relatively low master cylinder pressure so that a sufficient brake force can be generated with a relatively small depressing force provided to the brake pedal 10. Thus, when the pump 34 functions normally, the pressure in the master cylinder pressure chamber 60 will not be increased to a considerably high level for a long period of time.

In the fluid pressure control valve 18, a clearance is provided between the spool 58 and the housing 42 so as to obtain smooth movement of the spool 58. Thus, the pressure in the master cylinder pressure chamber 60 is maintained at a high level for a long period of time, the brake fluid flows out from the master cylinder pressure chamber 60 to the low pressure chamber 62 through the clearance. This may cause a piston in the pressurizing chamber of the master cylinder 12 being moved to the end of its stroke. This state of the master cylinder may be hereinafter referred to as "bottoming" of the master cylinder. When the bottoming of the master cylinder 12 occurs, the master cylinder pressure cannot be increased if the depressing force to the brake pedal 10 is further increased. However, when the pump 34 functions normally, the bottoming of the master cylinder will not occur since the pressure in the master cylinder pressure chamber 60 is not increased to such a high level generated when the brake force is generated solely by the master cylinder pressure.

On the other hand, if a failure occurs in the pump 34, the fluid pressure control valve 18 cannot function as a pressure booster. In such a case, the bottoming of the master cylinder 12 may easily occur. That is, in the hydraulic brake apparatus according to the present embodiment, if a failure occurs in the pump 34 and a high pressure fluid cannot be supplied to the high pressure source port 40, a brake force is generated by supplying the master cylinder pressure to the wheel cylinder 52 via the check valve 50. In such a condition, the pressure in the master cylinder pressure chamber 60 is maintained at a high level for a long time so as to obtain a sufficient brake force. Additionally, in such a condition, the spool 58 is moved to a position close to the rightmost position in FIG. 1 since the pressure in the master cylinder pressure chamber is high. When the spool 58 is moved to such a position, a sealing part between the master cylinder pressure chamber 60 and the low pressure chamber 62 is reduced, resulting in a decrease of the sealing effect. Thus, the brake fluid in the master cylinder pressure chamber 60 easily passes through the clearance. Thus, a large amount of the brake fluid in the master cylinder 12 may flow to the low pressure passage 24 in a short time. This results in the bottoming of the master cylinder 12.

The hydraulic brake apparatus according to the present embodiment has an advantage in that the bottoming of the master cylinder 12 can be prevented even when a high pressure cannot be supplied to the high pressure source port 40. That is, in the above-mentioned hydraulic brake apparatus, the low pressure source passage control valve 28 is closed when the pressure in the high pressure source passage 26 is decreased due to a failure in the pump 34. If the low pressure source passage control valve 28 is closed, the brake fluid flowing from the master cylinder pressure chamber 60 to the low pressure chamber 62 does not reach the reservoir tank 22. Thus, the bottoming of the master cylinder 12 can be positively prevented when a failure occurs in the pump 34.

If the depression of the brake pedal 10 is released in a state where a high pressure is not supplied to the high pressure source port 40, the spool is moved back by the hydraulic reaction force exerted by the reaction force pin 70 so that the displacement of the spool 58 is decreased. Thus, the brake fluid supplied to the wheel cylinder 52 via the first check valve 50 during a braking operation can be returned to the master cylinder 12 by opening the second control valve 32 at the same time the depressing force is released.

In the above-mentioned embodiment, the pump 34, the accumulator 36, the check valve 38 and the high pressure source passage together corresponds to a high pressure source. The reservoir tank 22 corresponds to a low pressure source. The low pressure source passage control valve 28 corresponds to low pressure source closing means. The low pressure source passage control valve 28 also corresponds to a mechanical valve.

Figure 3:
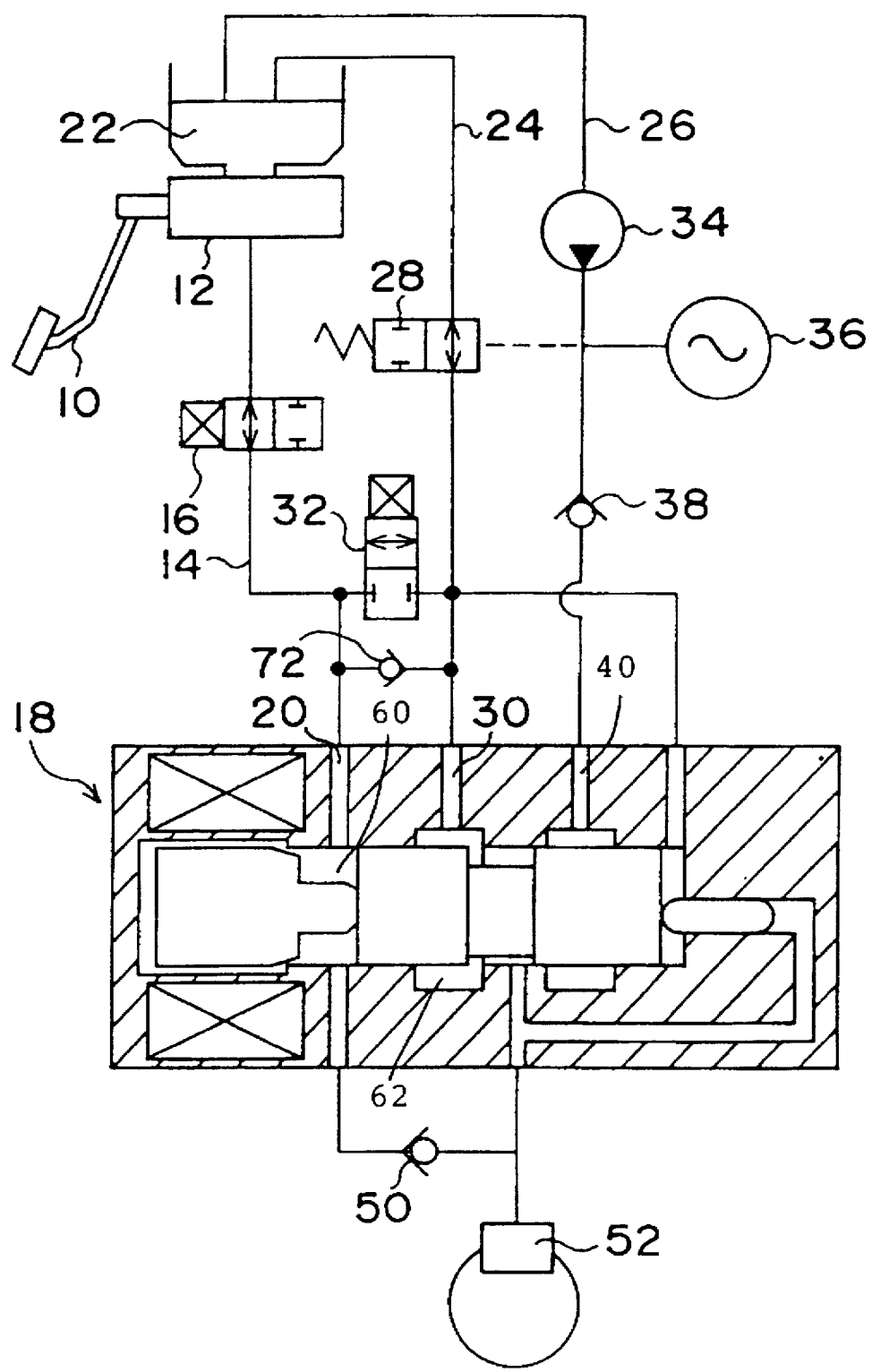
FIG. 3 is a system diagram of a hydraulic brake apparatus according to a second embodiment of the present invention.

A description will now be given of a second embodiment of the present invention. FIG. 3 is a system diagram of a hydraulic brake apparatus according to the second embodiment of the present invention. In FIG. 3, parts that are the same as the parts shown in FIG. 1 are given the same reference numerals, and descriptions thereof will be omitted.

The hydraulic brake apparatus according of the second embodiment has the same construction as that of the first embodiment except for a second check valve 72 connecting between the master cylinder passage 14 and the low pressure source passage 24. The second check valve 72 is provided parallel to the second control valve 32. An end of the second check valve 72 is connected to a portion of the low pressure source passage 24 between the low pressure source passage control valve 28 and the low pressure source port 30.

The second control valve 72 is a one-way valve which allows a flow from the low pressure source passage 24 to the master cylinder passage 14. Accordingly, the hydraulic brake apparatus according to the present embodiment performs the same operation as the hydraulic brake apparatus according to the first embodiment except for a case where a pressure in the low pressure source passage 24 exceeds the master cylinder pressure.

In the hydraulic brake apparatus according to the present embodiment, a pressure in the low pressure source passage 24 exceeds the master cylinder pressure when the brake pedal 10 was depressed and released in a condition where a high pressure is not provided to the high pressure source port 40 due to failure of the pump 34, for example. That is, the low pressure source passage control valve 28 is closed when a failure occurs in the pump 34. In such a condition, the brake fluid is provided to the wheel cylinder 52 via the first check valve 50 when the brake pedal 10 is depressed, and thus the wheel cylinder pressure is increased. After the depression of the brake pedal 10 is released, the master cylinder pressure is decreased. However, the wheel cylinder pressure is directed to the low pressure source port 30 via the low pressure chamber 62. Thus, the pressure in the low pressure source passage 24 becomes greater than the master cylinder pressure.

In the previously discussed first embodiment of the present invention, the pressure in the low pressure source passage 24 is released by opening the second control valve 32. On the other hand, in the present embodiment, the pressure exceeding the pressure in the master cylinder passage 14 is released to the master cylinder passage 14 by the second check valve 72 without opening the second control valve 32. Thus, confinement of the wheel cylinder pressure during a high pressure source failure can be prevented by adding a simple mechanical structure such as the second check valve 72.

Figure 4:
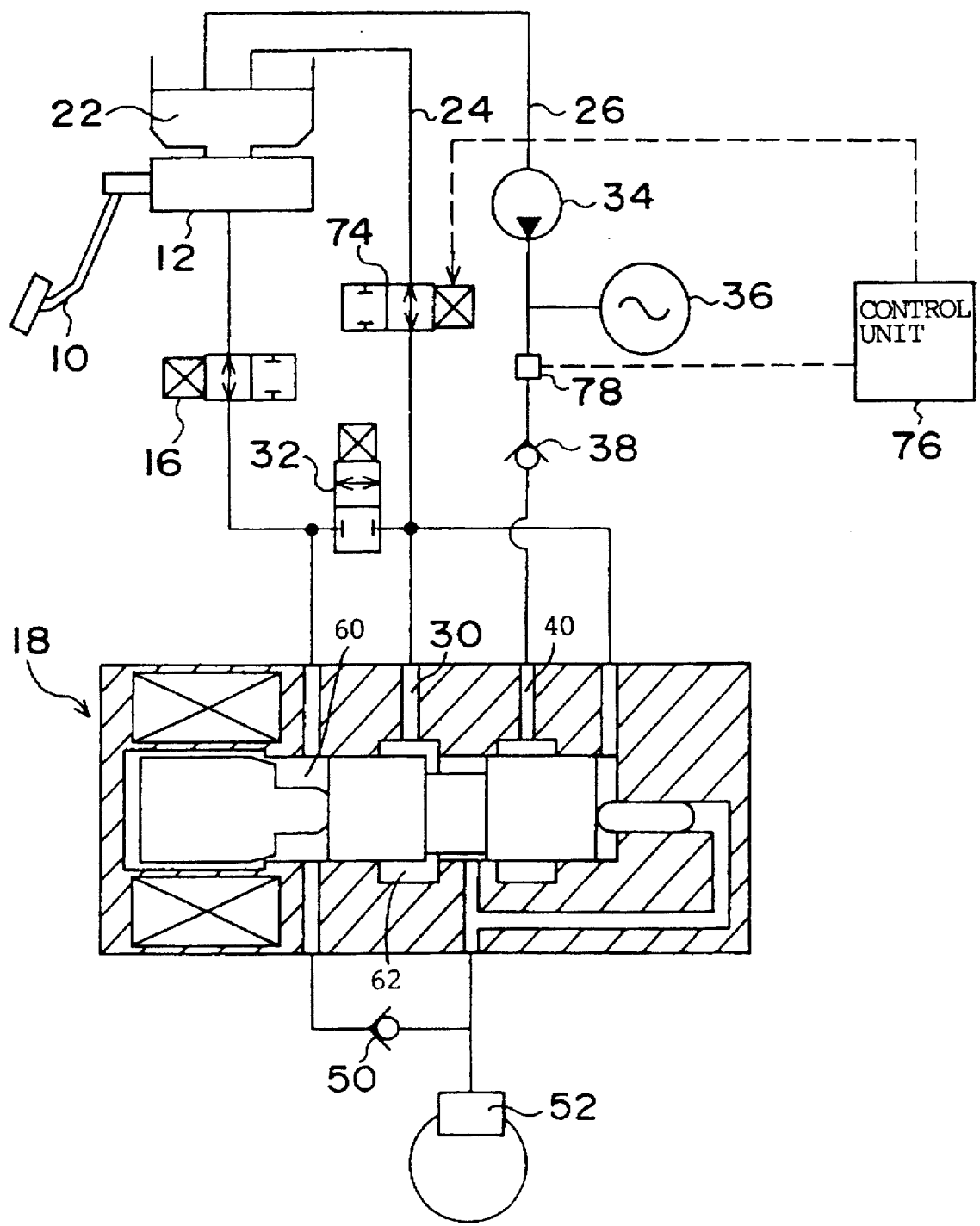
FIG. 4 is a system diagram of a hydraulic brake apparatus according to a third embodiment of the present invention.

A description will now be given of a third embodiment of the present invention. FIG. 4 is a system diagram of a hydraulic brake apparatus according to the third embodiment of the present invention. In FIG. 4, parts that are the same as the parts shown in FIG. 1 are given the same reference numerals, and descriptions thereof will be omitted.

The hydraulic brake apparatus according to the present embodiment has the same construction as that of the first embodiment except that the low pressure source passage control valve 28 is replaced by a low pressure source passage control valve 74 comprising an electrically operated valve. That is, the third embodiment indicates that the first and second embodiments are not limited to the mechanically operated valve 28, and the mechanically operated valve 28 can be replaced with an electrically operated valve 74.

The low pressure source passage control valve 74 is a normally open solenoid valve which is closed when a drive signal is supplied thereto. Operation of the low pressure source passage control valve 74 is controlled by a control unit 76. A pressure sensor which detects a pressure in the high pressure source passage 26 is connected to the control unit 76 so as to supply a pressure signal to the control unit 76. The control unit 76 sends the drive signal to the low pressure source passage control valve 74 when the pressure detected by the pressure sensor 78 is less than a predetermined pressure since it can be determined in such a condition that a failure occurs in the high pressure source side including the pump 34.

That is, in the above-mentioned hydraulic brake apparatus according to the present embodiment, the low pressure source passage control valve 74 is closed when the pressure in the high pressure source passage 26 is decreased due to a failure in the pump 34. If the low pressure source passage control valve 74 is closed, the brake fluid flowing from the master cylinder pressure chamber 60 to the low pressure chamber 62 does not reach the reservoir tank 22. Accordingly, the hydraulic brake apparatus according to the present embodiment has the same advantage as that obtained in the above-mentioned first and second embodiments in that the bottoming of the master cylinder 12 can be prevented even when a high pressure cannot be supplied to the high pressure source port 40.

The present invention is not limited to the specifically disclosed embodiments, and variations and modifications may be made without departing from the scope of the present invention.

What is claimed is:

1. A hydraulic brake apparatus generating a wheel cylinder pressure provided to a wheel cylinder by a high pressure brake fluid provided by a high pressure brake fluid source, the wheel cylinder pressure being controlled in response to a master cylinder pressure generated by a master cylinder, said hydraulic brake apparatus comprising:

a fluid pressure control valve having a spool movable in response to the master cylinder pressure put on one side thereof so as to connect one of said high pressure brake fluid source and a low pressure brake fluid source to said wheel cylinder so that the wheel cylinder pressure is controlled in response to the master cylinder pressure;

a low pressure source passage connecting said low pressure brake fluid source to said fluid pressure control valve so as to supply a low pressure brake fluid to said fluid pressure control valve; and a low pressure source passage control valve for closing said low pressure source passage in the absence of the high pressure brake fluid being provided to said fluid pressure control valve.

2. The hydraulic brake apparatus as claimed in claim 1, further comprising a control valve for connecting said master cylinder and a portion of said low pressure source passage between said low pressure source passage control valve and said fluid pressure control valve, said control valve being opened in the absence of the high pressure brake fluid being provided to said fluid pressure control valve.

3. The hydraulic brake apparatus as claimed in claim 2, further comprising a first check valve for allowing brake fluid to flow in a direction from said master cylinder to said wheel cylinder.

4. The hydraulic brake apparatus as claimed in claim 3, further comprising a second check valve for allowing brake fluid to flow in a direction from a portion of said low pressure source passage between said low pressure source passage control valve and said fluid pressure control valve to said master cylinder.

5. The hydraulic brake apparatus as claimed in claim 1, further comprising:

a first check valve for allowing brake fluid to flow in a direction from said master cylinder to said wheel cylinder; and a second check valve for allowing brake fluid to flow in a direction from a portion of said low pressure source passage between said low pressure source passage control valve and said fluid pressure control valve to said master cylinder.

6. The hydraulic brake apparatus as claimed in claim 1, wherein said low pressure source passage control valve comprises a mechanically operated valve.

7. The hydraulic brake apparatus as claimed in claim 6, wherein said mechanically operated valve is connected to said high pressure brake fluid source so as to receive a high pressure generated in said high pressure brake fluid source as a pilot pressure to control a closing operation of said mechanically operated valve.

8. The hydraulic brake apparatus as claimed in claim 7, wherein said mechanically operated valve closes when said pilot pressure is lower than a predetermined pressure.

9. The hydraulic valve as claimed in claim 1, wherein said low pressure source passage control valve comprises an electrically operated valve.

10. The hydraulic brake apparatus as claimed in claim 9, further comprising a pressure sensor for sensing a pressure in said high pressure brake fluid source and a control unit for sending a drive signal to said electrically operated valve when the pressure sensed by said pressure sensor is lower than a predetermined pressure, said electrically operated valve being closed when said drive signal is supplied thereto.

* * * * *